(12) United States Patent
Yoshioka et al.

(10) Patent No.: US 7,672,764 B2
(45) Date of Patent: Mar. 2, 2010

(54) SYSTEM AND METHOD FOR RECORDING PHYSICAL RESPONSE

(75) Inventors: Satomi Yoshioka, Yokohama (JP); Ichiro Yoshida, Takahama (JP); Tsuyoshi Nakagawa, Aichi-gun (JP)

(73) Assignee: DENSO CORPORATION, Kariya (JP)

( * ) Notice: Subject to any disclaimer, the term of this patent is extended or adjusted under 35 U.S.C. 154(b) by 822 days.

(21) Appl. No.: 11/498,233

(22) Filed: Aug. 3, 2006

(65) Prior Publication Data

US 2007/0032929 A1 Feb. 8, 2007

(30) Foreign Application Priority Data

Aug. 8, 2005 (JP) .............................. 2005-229480

(51) Int. Cl.
*G06F 19/00* (2006.01)
(52) U.S. Cl. ......................................... 701/35; 701/208
(58) Field of Classification Search ........................ None
See application file for complete search history.

(56) References Cited

U.S. PATENT DOCUMENTS 5,815,070 A * 9/1998 Yoshikawa .................. 340/439
6,292,719 B1 * 9/2001 Seto et al. ....................... 701/1
6,909,947 B2 * 6/2005 Douros et al. ................. 701/29
7,006,917 B2 * 2/2006 Hijikata ...................... 701/301
7,349,782 B2 * 3/2008 Churchill et al. .............. 701/45
2004/0267455 A1 * 12/2004 Hatano et al. ................. 702/2
2005/0130597 A1 * 6/2005 Li et al. .................... 455/67.11
2006/0220915 A1 * 10/2006 Bauer .......................... 340/945
2007/0257804 A1 * 11/2007 Gunderson et al. .......... 340/576
2007/0290867 A1 * 12/2007 Kuramori et al. ........... 340/576

FOREIGN PATENT DOCUMENTS

| JP | A-10-262958 | 10/1998 |
|----|-------------|---------|
| JP | A-2003-123185 | 4/2003 |
| JP | A-2005-44167 | 2/2005 |

* cited by examiner

*Primary Examiner*—Michael J. Zanelli
(74) *Attorney, Agent, or Firm*—Posz Law Group, PLC

(57) ABSTRACT

A physical response record system includes a main unit and various sensors for recording driver's conditions and vehicle operations by a driver. The driver's conditions in combination with the vehicle operations are used to determine a risky situation of the vehicle based on an averaged driver's condition and the like. The risky situation is further analyzed for detecting a risky object and stored as a record for later use.

18 Claims, 6 Drawing Sheets

SYSTEM AND METHOD FOR RECORDING PHYSICAL RESPONSE

CROSS REFERENCE TO RELATED APPLICATION

This application is based on and claims the benefit of priority of Japanese Patent Application No. 2005-229480 filed on Aug. 8, 2005, the disclosure of which is incorporated herein by reference.

FIELD OF THE DISCLOSURE

The present disclosure generally relates to a physical response record system in a vehicle.

BACKGROUND OF THE DISCLOSURE

Conventionally, a driver in a vehicle recognizes current driving situation based on his/her experience and external information such as an accident warning sign posted on a roadside signboard or the like. Recognition of the current driving situation includes an approach toward a high-risk point of a road or the like. However, the driver may be aware of the driving situation only about a frequently-traveled road. On the other hand, an increased availability of a navigation system in the vehicle serves as an enhancement of route selection, thereby providing for the driver an increased chance of travel in a less-frequently-traveled road, in a less-familiar road or the like. In view of the above-described situation, information provision regarding the high-risk point of the road by using a road map displayed on the navigation system is considered as an effective driving support for the travel in the less-familiar road or the like.

The driving situation of the vehicle is experimentally determined by using vehicle operation data and biometric indexes derived from the vehicle and the driver so as to detect the high-risk point on the road. For example, the vehicle operation data such as an operation of an anti-lock brake system and/or acceleration/deceleration of the vehicle is used to determine whether the vehicle is making a sudden stop. The vehicle passing the high-risk point may also be detected and determined based on biometric data of physical status, because the driver typically shows a characteristic response when the vehicle is passing the high-risk point. For example, a sudden increase of driver's heat rate may be an indication of the high-risk point even when the vehicle operation data does not show any abnormality.

Japanese patent document JP-A-2003-123185 discloses a technique that utilizes various sensor outputs to determine high-risk situations in driving, and serves a safety of driving by recording the high-risk points in road map data for later use. In this case, the high-risk situations includes abrupt steering, sudden braking, steep acceleration, skid, possibility of rear-end collision, over-speeding, high tension travel, driver's in excitement/tension, an accident prone point, pedestrian/bicycle warning, motor cycle warning, oncoming traffic, succeeding vehicle, low visibility, steep curve or the like.

However, the high-risk situation experienced at a specific point of the road has relevance to various factors such as a driver's skill, surrounding conditions of the vehicle that are arbitrarily given at the time of driving. Therefore, the driver may not catch a point of the warning message even when the pedestrian/bicycle warning is provided for the driver prior to the approach to the high-risk point. That is, the warning message may not be effective nor sufficient for the driver in terms of coping with the high-risk situation.

SUMMARY OF THE DISCLOSURE

In view of the above-described and other problems, the present disclosure provides a physical response record system that provides for a driver a factual support of risk recognition in association with a vehicle condition on a road based on records of a driver's response of the risk recognition.

A physical response record system includes a physical response recording unit for detecting and recording a physical response of a driver of a vehicle as response data that reflects a mental condition of the driver, an operation data recording unit for detecting and recording operation data of the vehicle, a position detector for detecting and recording a vehicle position, an imaging unit for imaging surroundings of the vehicle as a moving picture, a risk response detection unit for detecting the physical response of the driver as a risk response based on periodical observations of the response data and the operation data, an analysis unit for analyzing the moving picture taken at and around a time of the risk response, wherein the analysis of the moving picture determines and categorizes a moving object and/or a fixed object existing around the vehicle and a storage unit for detecting a speed and a moving direction of the moving object and/or the fixed object relative to the vehicle based on the analysis by the analysis unit and for storing the speed and the moving direction of the moving object and/or the fixed object in association with the vehicle position detected by the position detector. The physical response of the driver is determined as the risk response when the operation data indicates an abnormal condition in response to variation of the response data that exceeds a predetermined value. In this manner, a risky situation of the vehicle is analyzed and recorded by the physical response record system with information on an actual vehicle operation and surrounding conditions.

The risk response detection unit classifies the risk response into plural categories based on the type of the operation data. In this manner, the actual vehicle operation in the risky situation is recognized.

The risky situation of the vehicle is recorded in association with the vehicle position in map data. In this manner, the risky situation is associated with a shape of the ground and/or a shape of the road.

The risky situation of the vehicle is recorded in association with surrounding conditions of the vehicle by using a condition detector and other devices. In this manner, the surrounding conditions of the vehicle such as a weather condition, a road surface condition or the like is associated with the risky situation.

The risky situation of the vehicle is sent to and stored in an external control center. In this manner, the risky situation is collected in a database for later use by other drivers.

A driver support system of the present disclosure is capable of detecting a driver's condition based on sensor signals and vehicle operation data. The driver's condition showing abnormality is determined as a reflection of the risky situation by the driver support system, a risky situation/condition warning is provided for the driver prior to a travel through a risky point so as to avoid the risky situation experienced by a driver.

BRIEF DESCRIPTION OF THE DRAWINGS

Other objects, features and advantages of the present disclosure will become more apparent from the following detailed description made with reference to the accompanying drawings, in which.

DETAILED DESCRIPTION OF THE PREFERRED EMBODIMENTS

Embodiments of the present disclosure are described with reference to the drawings.

Figure 1:
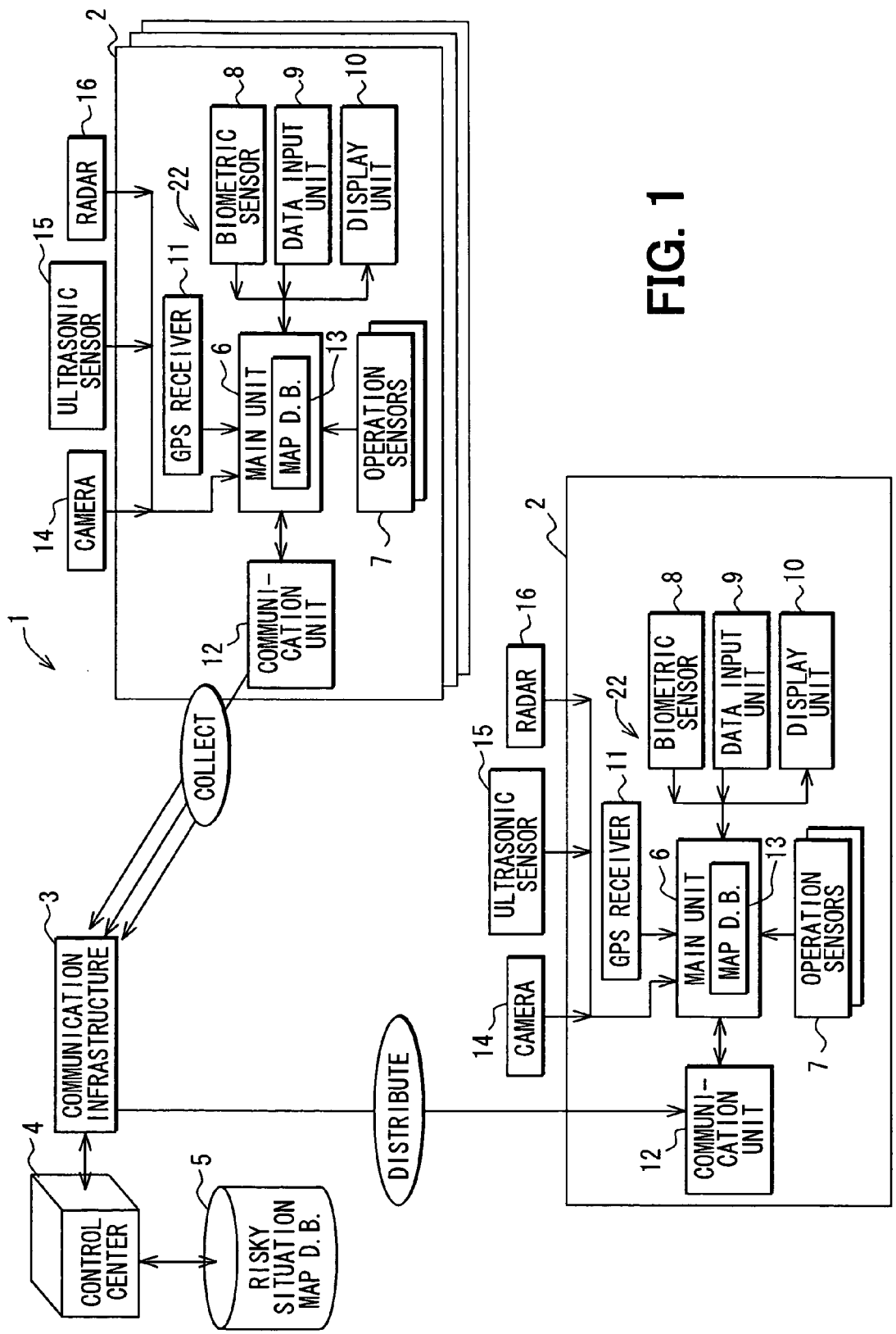
FIG. 1 shows a block diagram of a driver support system in an embodiment of the present disclosure.

FIG. 1 shows a block diagram of a driver support system 1 in an embodiment of the present disclosure. The driver support system 1 includes a navigation system 2 in a vehicle, an external control center 4 that collects and distributes information from/to the navigation system 2 through a communication infrastructure 3, and a risky situation map database (DB) 5 maintained in the external control center 4.

The navigation system 2 includes a main unit 6 in connection with operation sensors 7, biometric sensors 8, a data input unit 9, a display unit 10, a GPS receiver 11, a communication unit 12 and the like.

The main unit 6 includes a control unit having a CPU, a data storage, a map database 13 and the like. The main unit 6 has a function of a well-known type navigation system. The operation sensors 7 are disposed at various positions in the vehicle for detecting a speed of the vehicle and an operation condition of the vehicle. The biometric sensors 8 are used to detect physical conditions of a driver of the vehicle. The data input unit 9 is an interface for inputting various kinds of data regarding conditions around the vehicle such as a weather condition and the like. The display unit 10 is a device that displays map data and/or navigation guidance as a navigation system 2.

The GPS receiver 11 receives GPS signals from GPS satellites for detecting a vehicle position (a latitude and a longitude). The communication unit 12 is used for communication with the external control center 4 through the communication infrastructure 3 for, for example, exchanging traffic information, having connection to a cellular phone network or the like.

The vehicle having the navigation system 2 is equipped with a camera 14, an ultrasonic sensor 15, and a radar 16. The camera 14 captures an image of surroundings of the vehicle. The ultrasonic sensor 15 detects an object and measures a distance from the vehicle to the object. The radar 16 detects an object and the distance to the object as the ultrasonic sensor 15 does, and also detects a speed of the detected object. The signals outputted from these devices is provided for the main unit 6. An infrared sensor may additionally be used for determining whether the detected object is a human being.

The navigation system 2 serves as a terminal on the vehicle for transmitting collected data to the external control center 4, and also serves as a terminal for receiving data distributed by the external control center 4.

The main unit 6 and connected components described above serves as a physical response record system 22 of the present disclosure.

Figure 2:
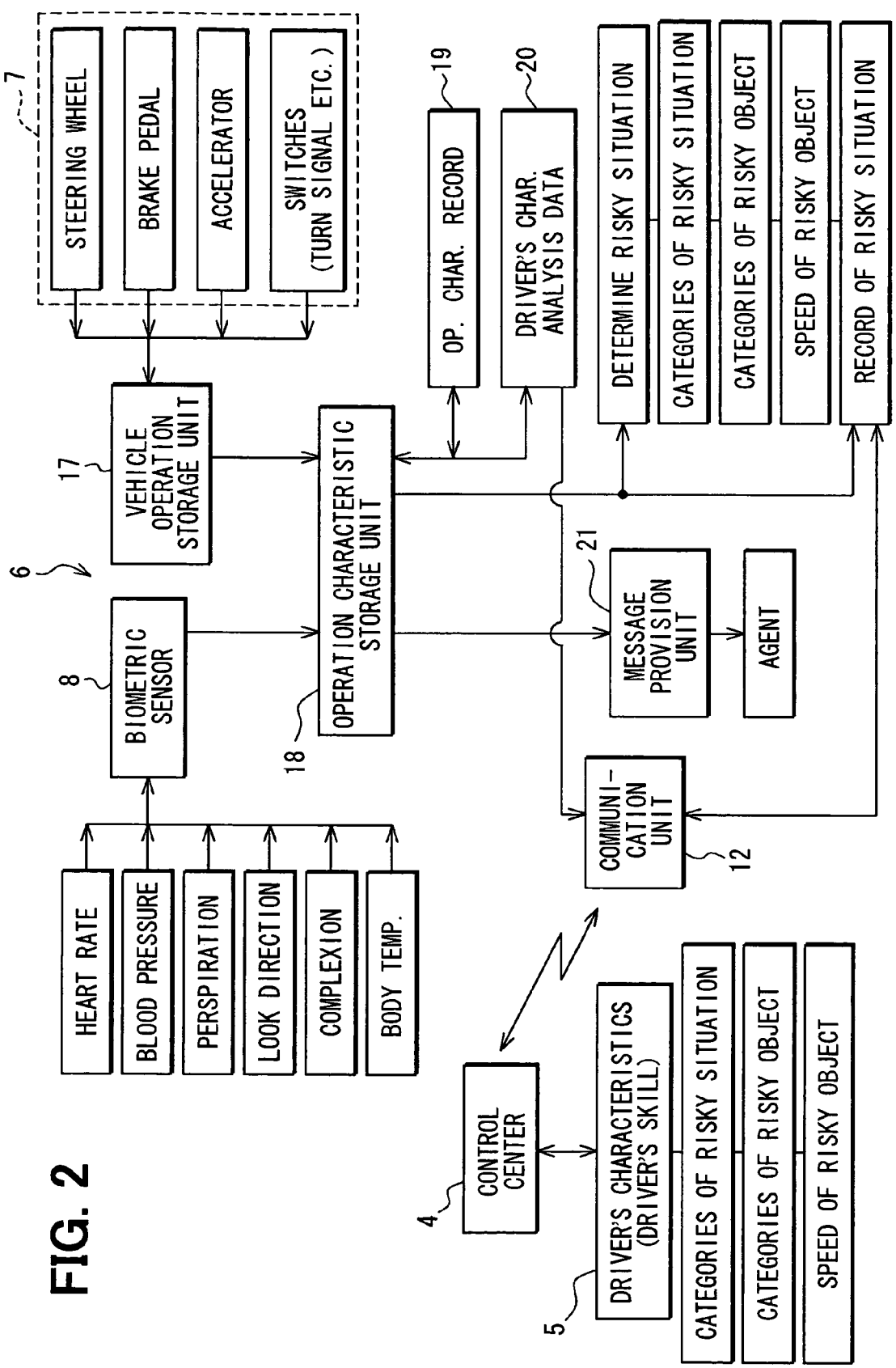
FIG. 2 shows a block diagram of a physical response record system as a part of a main unit of a navigation system in the embodiment.

FIG. 2 shows a block diagram of the physical response record system 22 as a part of the main unit 6 of a navigation system 1 in the present embodiment. The physical response record system 22 records risky situations in driving such as a sudden stop of the vehicle due to a close encounter with a child, bicycle or the like. The biometric sensors 8 are in contact with a driver's body at various positions for picking up a mental condition of the driver. For example, measurement of physical responses of the driver such as a heart rate, a blood pressure, perspiration, body temperature are collected and recorded. The biometric sensors 8 includes a driver camera for capturing complexion and/or look direction of the driver while the driver is operating the vehicle.

The operation sensors 7 includes a steering sensor, a brake pedal operation sensor, an accelerator sensor, a switch sensor for turn indicator switch, a lamp switch, a wiper switch and the like. Data from the operation sensors 7 are recorded by a vehicle operation storage unit 17. The information derived from the biometric sensors 8 and the data stored in the vehicle operation storage unit 17 are gathered in an operation characteristic storage unit 18 and stored as operation characteristic records 19. The operation characteristic records 19 include the vehicle position outputted from the GPS receiver 11 and map data of an area that includes the detected vehicle position. The operation characteristic records 19 further include additional data of the weather (precipitation, snow or the like) and atmospheric temperature at a time of measurement.

The operation characteristic records 19 are analyzed in the operation characteristic storage unit 18 to be stored as driver's characteristic analysis data 20. The driver's characteristic analysis data 20 includes a real time analysis data that reflects current condition and an average analysis data that is derived as an average for a certain period of driving operation. The average analysis data includes an analysis that records how the driver operated the vehicle in what type of vehicle position on the road in association with physical response measurement data derived from the biometric sensors 8. The real time analysis data and the average analysis data are recorded in association with the time of occurrence of the event (driving operation).

The risky situation encountered by the driver is detected and determined by using the real time analysis data and the average analysis data based on the assumption that an abnormal reading of the physical response in combination with an abrupt vehicle operation in vehicle operation data reflects the risky situation. For example, the operation characteristic storage unit 18 determines that the driver encountered the risky situation when the measurement of the physical response suddenly departs from the average.

In this case, the average of the measurement data may vary depending on the skill of the driver. For example, a newly-licensed driver shows risky situation physical response even when an inter-vehicle distance is long, while an experienced driver does not show the risk situation physical response when the inter-vehicle distance is short. These information and data leads to an analysis of the operation skill of the driver. Another example of the analysis may be depicted as a situation that a driver who shows the risky situation physical response in a close maneuver to a fixed object is regarded as having a low proficiency in driving operation.

A message provision unit 21 displays a message on the display unit 10, or outputs a guidance voice from a speaker (not shown in the figure) as a notification for the driver. The driver may use his/her voice for inputting an instruction to the navigation system 2 by using a microphone that is connected to a voice recognition unit (also not shown in the figure).

The message provision unit 21 provides an agent function that feeds a message of advice/guidance for a situation based on the physical response of the driver. For example, a driver determined to be in a normal condition may have a message that is suitable for the normal condition based on the heart rate, the perspiration and the like, and a driver in an increased tension may have a message of calm down or the like.

FIGS. 3 to 8 are used to describe a function of the physical response record system 22.

Figure 3:
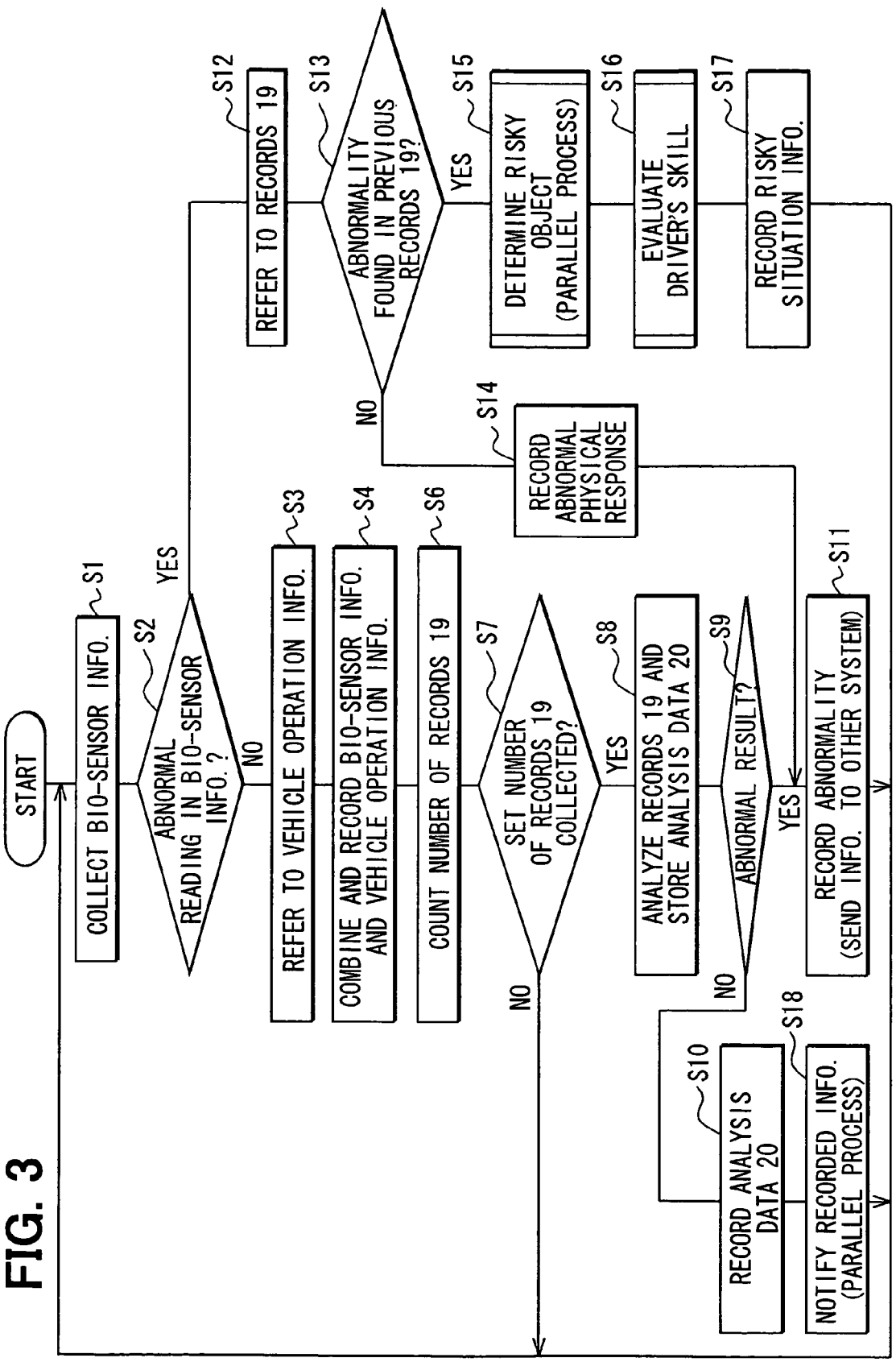
FIG. 3 shows a flowchart of a process in a driving condition storage unit.

FIG. 3 shows a flowchart of a process in the operation characteristic storage unit 18. In step S1, the process collect information of physical responses from the biometric sensors 8. In step S2, the process examine the information from the biometric sensors 8 whether an abnormal reading is found in the information. The process proceeds to step S12 when the abnormal reading is found in the information step S2:YES). Then, in step S12, the process in the operation characteristic storage unit 18 refers to the operation characteristic records 19 before the abnormality detected by the vehicle operation storage unit 17.

In step S13, the process determines whether the abnormality is found in the records 19. The process proceeds to step S15 based on the assumption that the driver showed the risky situation physical response when the abnormality is found in the operation characteristic records 19 in step S13 (step S13: YES). In step S15, the process determines what object caused the risky situation, and proceeds to step S16. In step S16, the process determines a driver's skill, and proceeds to step S17. In step S17, the process records the risky situation information with the driver's skill. The risky situation information is categorically recorded based on the types of abnormality in the vehicle operation data. For example, the risky situation information is categorized and recorded as a sudden brake type, an abrupt steering type or the like when the abnormality in the vehicle operation data is brake related operation or steering related operation.

The map data of an area that includes the point of the risky situation is recorded by retrieving the map data from the map database 13. That is, a point of the risky situation is analyzed in terms of the shape of the road. For example, the point of the risky situation is associated with a straight road, a junction, an intersection, a local road, an expressway, a slope or the like.

Further, a surrounding condition of the vehicle at the time of the risky situation is recorded based surrounding condition data inputted from the data input unit 9. The surrounding condition includes weather information such as a rain, a snow or the like, and related information such as a slippery condition of a road surface, night/day distinction of the time or the like. In other words, the data input unit 9 may be a radio for receiving traffic/weather information, a weather detection sensor, or even an input of the equivalent information from the driver. The process in the operation characteristic storage unit 18 determines the surrounding condition based on the information and/or data from the data input unit 9.

The process proceeds to step S14 when the abnormality is not found in the operation characteristic records 19 in step S13 (step S13:NO). In step S14, the process records the abnormality as an abnormal physical response. In this case, the process in step S14 is not necessary when the abnormal physical response is recorded by the biometric sensors 8.

The process proceeds to step S3 when the abnormal reading is not found in the information (step S2:NO). In step S3, the process refers to vehicle operation information in the vehicle operation storage unit 17. Then, in step S4, the information from the biometric sensors 8 and vehicle operation information are combined to be recorded as operation characteristic records 19. The operation characteristic records 19 is associated with the vehicle position data, time data, and surrounding condition data.

In step S6, the process counts the number of collected records 19 by using the operation characteristic storage unit 18.

In step S7, the process determines whether a predetermined number of records 19 is collected. The process returns to step S1 when the predetermined number has not been reached (step S7:NO). The process proceeds to step S8 when the number of the records 19 has reached the predetermined number (step S7:YES).

In step S8, the process analyzes the records 19 statistically. For example, each piece of the records 19 collected at an interval of 100 ms are analyzed as a set of 10 pieces of records 19 at every second to have average data and standard deviation data. The analyzed data are recorded as driver's characteristic analysis data 20.

In step S9, the process determines whether the analysis data 20 has the abnormality. The process proceeds to step S10 when the abnormality is not found in the analysis data 20 (step S9:NO). In this case, the driver is assumed to be in a normal condition. Then, in step S18, the process refers to risky situation information stored in the main unit 6 and provides for the driver a cause/event of the risky situation at a current vehicle position if it exists. In this manner, the driver can recognize the provision of the cause/event of the risky situation more appropriately compared to the provision of the same information just after a risky situation.

The process proceeds to step S11 when the abnormality is found in the analysis data 20 (step S9:YES). For example, when the analysis data 20 shows a departure over a standard deviation from the average, the analysis data 20 is recorded in a different area. The process sends the abnormal analysis result to other system such as, for example, a body ECU (Electric Control Unit).

Figure 4:
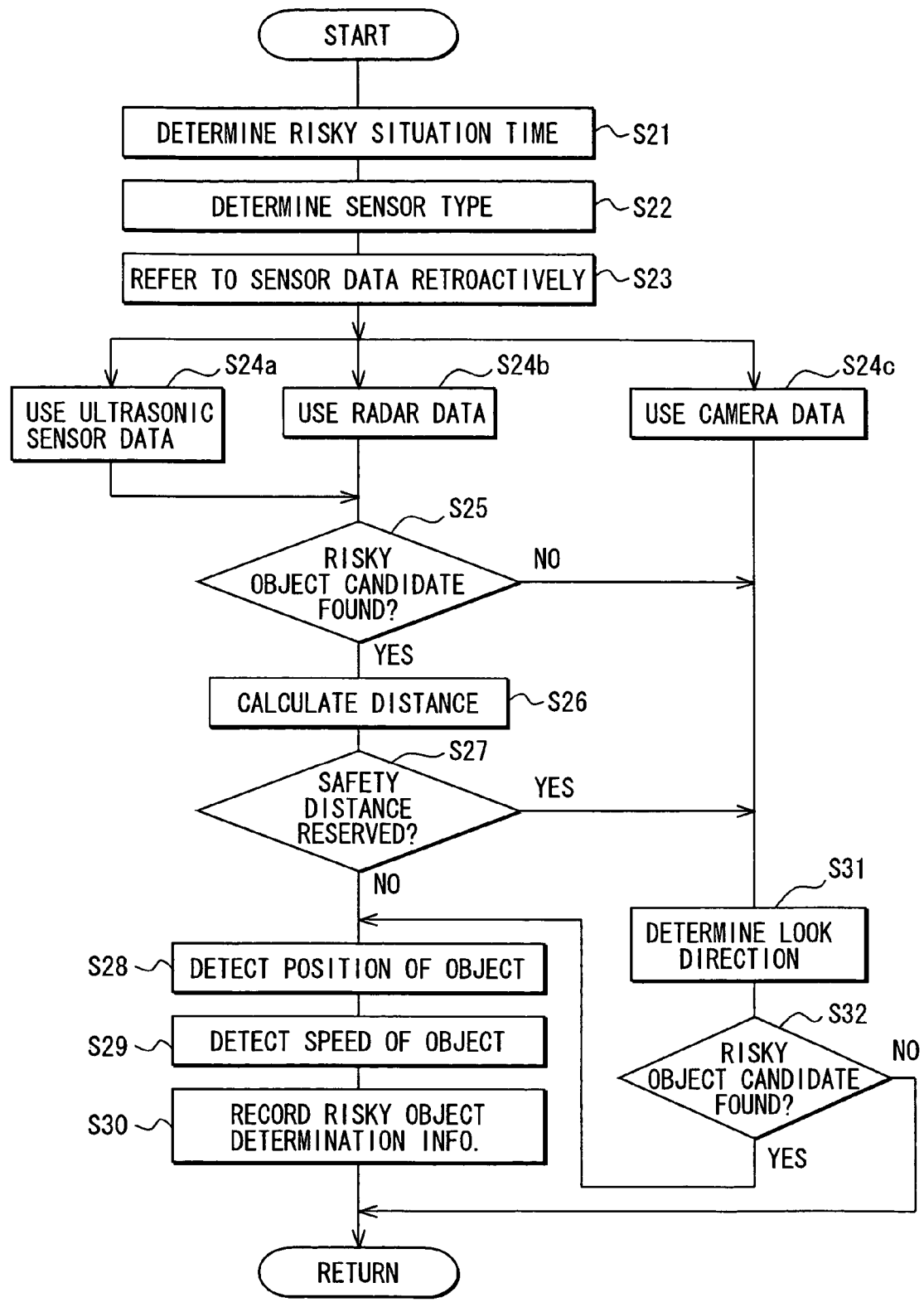
FIG. 4 shows a flowchart of a risky object determination executed as the process in an operation characteristic storage unit.

FIG. 4 shows a flowchart of a risky object determination executed in step S15 of the process in the operation characteristic storage unit 18.

In step S21, the process determines and records the time of the risky situation detected in step S13 (step S13:YES) of a parent process.

In step S22, the process determines what type of sensors on board is available for determining the risky object.

In step S23, the process refers to measurement data derived from the sensors determined in step S22.

In the present embodiment, the driver camera, the camera 14 for imaging the surroundings of the vehicle, the ultrasonic sensor 15, and the radar 16 are disposed on the vehicle as biometric sensors 8. The measurement data from these sensors are referred to for retroactively determining the risky object.

In steps S24*a*, S24*b* to S26, the process uses data from the ultrasonic sensor 15 and data from the radar 16 to determine whether a risky object candidate exists in a proximity of the vehicle, and how far the risky object candidate is from the vehicle after the risky object candidate is found (step S25: YES). The distance from the risky object candidate is calculated based on the data from the radar 16.

In step S27, the process determines whether the distance is equal to or greater than a predetermined safety value. The process proceeds to step S28 when the distance is not equal to or greater than the predetermined safety value based on the determination that the existence of the object is risky for the vehicle (step S27:NO).

In steps S28 and S29, the process detects a position of the detected risky object and a speed of the risky object. For example, the speed of the risky object is detected and determined as zero when the risky object is stopping on the road.

In step S30, the process records information on the risky object as risky object determination information. Then, the process returns the parent process.

In steps S24c and S31, the process uses camera data (i.e., the image) to determine a look direction of the driver.

In step S32, the process determines the look direction of the driver coincides with the direction of the risky object candidate. This process also determines the look direction even after a negative determination is step S25 (i.e., no risky object found), because the ultrasonic sensor 15 and the radar 16 can detect limited types of objects. The process proceeds to step S28 when the risky object candidate is found (step S32:YES). The process returns to the parent process when the risky object is not found.

Figure 5:
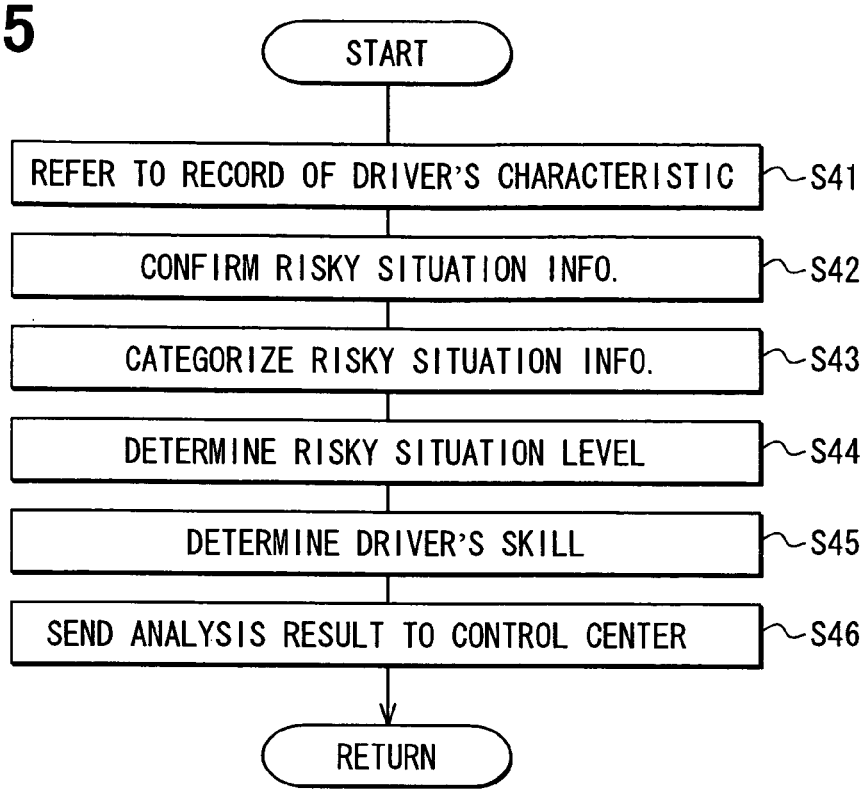
FIG. 5 shows a flowchart of a driver's skill evaluation executed as the process in the operation characteristic storage unit.

FIG. 5 shows a flowchart of a driver's skill evaluation executed in step S16 of the process in the operation characteristic storage unit 18.

In steps S41 and S42, the process refers to records of the driver's characteristic and retrieves/confirms the risky situation information. Then, in step S43, the process categorizes the risky situation information by using various skill evaluation criteria. For example, as shown as a radar chart in FIG. 6, a braking operation speed, an acceleration operation speed, a right/left steering operation speed, a confirmation operation speed, a switch operation speed and the like are analyzed and categorized. Data of the braking operation speed, the acceleration operation speed, the steering operation speed, and the switching operation speed are collected by using the operation sensors 7. The confirmation operation speed is measured by analyzing the look direction of the driver in the image captured by the driver camera.

Each of the skill evaluation criteria have three ranks, that is, a high level, a middle level, and a low level for evaluation of the operation speeds relative to an average operation speed of each criterion.

In step S44, the process analyzes the operation speeds to determine the driver's skill level. Then, in step S45, the process determines the driver's skill level. In this case, the time of driving (e.g., day/night etc.) is taken into consideration of the driver's skill evaluation.

In step S46, the process sends the result of analysis to the external control center 4. The result of the analysis is registered in the risky situation map database 5.

Figure 6:
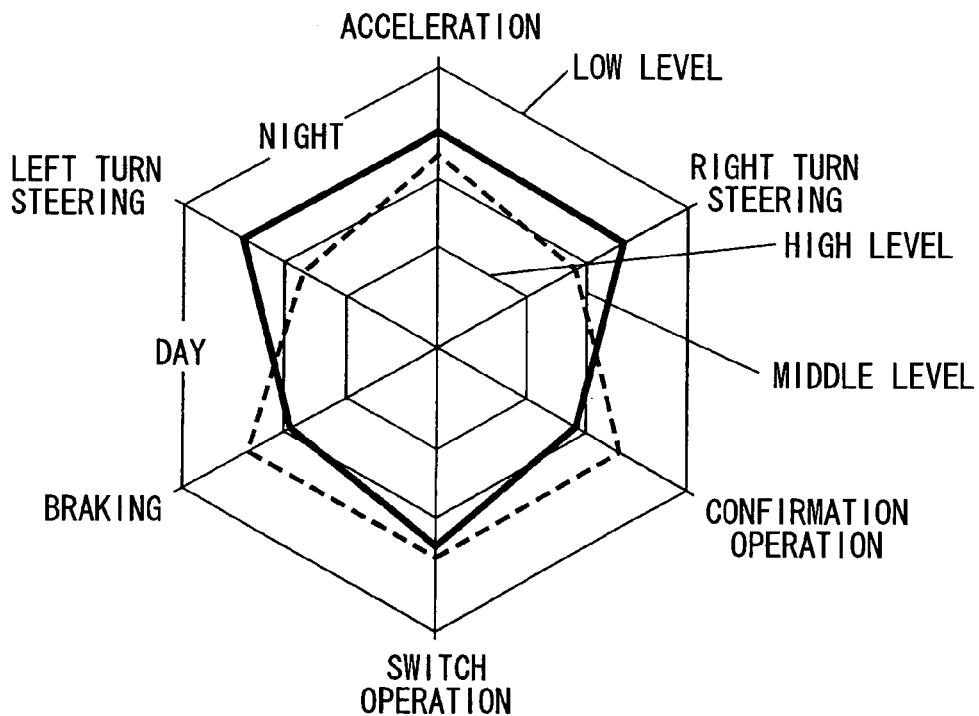
FIG. 6 shows a chart of the driver's skill determined by a driver's skill evaluation process.

FIG. 6 shows an example of a chart of the driver's skill determined by the driver's skill evaluation process.

The operation speed of each of the criteria is greater as it approaches an origin of the chart. That is, the driver's skill is considered to be in a higher level when the data is closely plotted to the origin. For example, the analysis data plotted by a solid line is distributed from the external control center 4 as the risky situation information for a low level driver regarding the skill evaluation criteria of the right turn steering/left turn steering/acceleration operation at night, and risky situation information for a middle level driver regarding the criterion of the braking operation when the information is requested from the vehicle (described later in the present embodiment).

Figure 7:
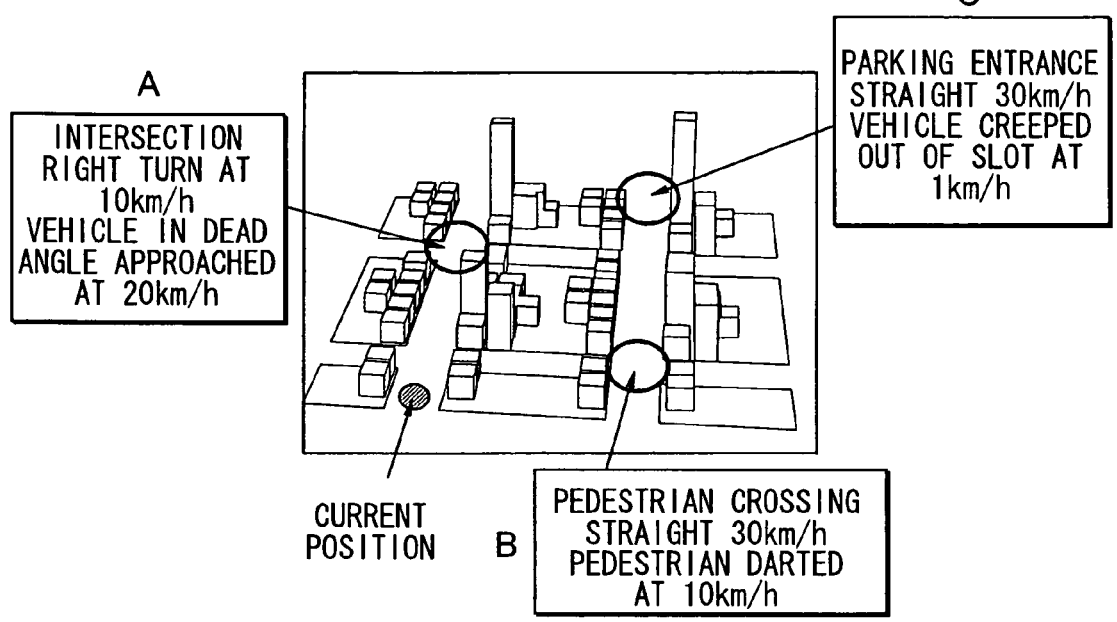
FIG. 7 shows an illustration of a risky situation information shown on a three-dimensional map.

FIG. 7 shows an illustration of the risky situation information shown on a three-dimensional map (i.e., a risky situation map). In this situation map, thee types of risky situations are illustrated. That is, at an intersection A ahead of the vehicle, a close encounter with another vehicle approaching from a dead angle at the speed of 20 km/h is experienced when the driver is turning right at the speed of 10 km/h (an oversight of the another vehicle in a dead angle). At a pedestrian crossing B on the right, a pedestrian darted into the road at the speed of 10 km/h when the vehicle is traveling straight at the speed of 30 km/h. At a parking entrance C on the diagonally forward right, a creeping car from one of the parking slots approached to the vehicle at the speed of 1 km/h when the driver is traveling straight at the speed of 30 km/h.

Figure 8:
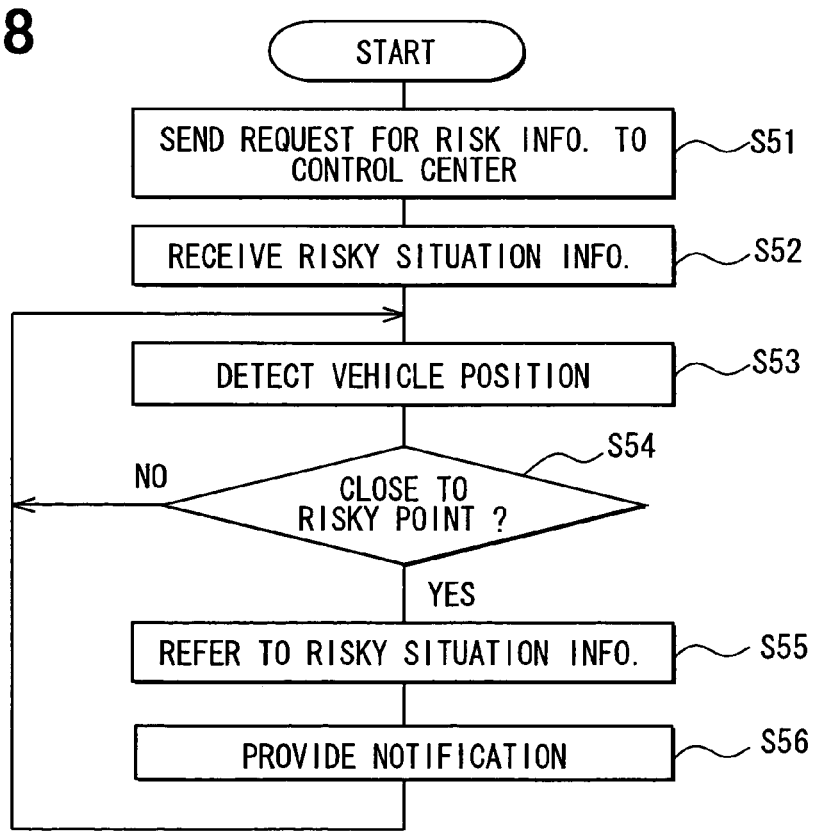
FIG. 8 shows a flowchart of a process of driving operation based on information collected by an external control center.

FIG. 8 shows a flowchart of a process of driving operation based on the information in the risky situation map database 5 collected in the external control center 4.

In step S51, the process sends a request for information based on an operation of the driver from the navigation system 2 to the external control center 4.

In step S52, the process receives the risky situation information of the driver's skill level from the external control center 4 after retrieving it from the database 5. The received information is stored in the navigation system 2.

In steps S53 and S54, the process acquires the vehicle position by using the GPS receiver 11 and sends the position to the main unit 6 of the navigation system 2. Then, the main unit 6 determines whether the vehicle position is approaching the point of the risky situation (a risky point: e.g., within 100 meters from the point). The process proceeds to step S55 when the vehicle position is close to the risky point (step S54:YES). Then, in step S55, the process refers to the risky situation information for acquiring the information about the risky point.

In step S56, the process provides a driving support guidance by notifying the driver of the risky situation information at the risky point as a voice message or the like. For example, for the driver in the vehicle at the intersection A in FIG. 7, a message sounds like "Overlooked a vehicle in a dead angle at the next intersection when turning right." The voice message may be accompanied by information of vehicle speeds of a subject vehicle and the overlooked vehicle displayed on the display unit 10.

As previously described in the present embodiment, the main unit 6 of the navigation system 2 has the operation characteristic storage unit 18 for periodically observing the physical response of the driver and the vehicle operation data, and determines the risky situation physical response based on the abnormality of the vehicle operation data. The risky situation is further analyzed for recording the surrounding condition such as the type, the speed, and the moving direction of the risky object and the like. In this manner, the record of the risky situation can be used later when the vehicle travels the same portion of the road.

The risky situation record in the operation characteristic storage unit 18 can be used for the analysis of the vehicle operation at the time of the risky situation. The risky situation record can also be used for the analysis of the road/ground shape because it includes the map data of the risky situation point. In addition, the risky situation record is used to determine the surrounding condition of the vehicle at the time of the risky situation.

The main sends the risky situation information to the external control center 4 by the communication unit 12. The risky situation information is collected and maintained in the control center 4 as the risky situation map database 13. Then, the risky situation information is distributed for utilization in the vehicle. In this manner, the risky situation information from individual vehicles can be shared and used by other vehicles.

The main unit 6 provides a feedback for the driver based on the abnormal reading of the physical response and/or the abnormal vehicle operation. In this manner, a driver's condition that may lead to the risky situation can be detected and warned in advance. That is, the risky situation can be forewarned and avoided by the driver support system 1 of the present disclosure.

Although the present disclosure has been fully described in connection with the preferred embodiments thereof with reference to the accompanying drawings, it is to be noted that various changes and modifications will become apparent to those skilled in the art.

For example, the risky situation information may be sent as a collection of data to the external control center 4 after the travel of the vehicle by temporarily storing the information in a buffer or the like in the navigation system 2.

Different risky situation maps may be created in accordance with the variation of the day of the week, the time slot of the day, the season, and the weather. The risky situation map may take the vehicle type into consideration.

A windshield display or a headsup display may be used for displaying the risky situation map so that the driver needs not move the eyes to look into the map. The risky object may be highlighted in the risky situation map, and the intensity of the risky object may be dimmed for avoiding a gaze by the driver.

The vehicle position may be derived from different source of information from the GPS signal from the satellite. That is, the traffic information may be used as the source of the vehicle position.

The warning for the driver from the main unit 6 may be turned on and off on demand.

The biometric sensors 8 may selectively be used based on an individual design and arrangement of the vehicle, the navigation system 2, the main unit 6 or the driver.

The record of the risky situation point may be selectively combined with information on the risky situation type, surrounding conditions or the like.

An upload of the collected information from the vehicle to the external control center 4 may be selectively turned on and off. The collected information may be used only in the respective vehicles.

The risky situation record system or the driver support system may have a dedicated system unit instead of being implemented as a component of the navigation system 2.

Such changes and modifications are to be understood as being within the scope of the present invention as defined by the appended claims.

What is claimed is:

1. A physical response record system comprising:
   a physical response recording unit for detecting and recording physical response of a driver of a vehicle as response data that reflects a mental condition of the driver;
   an operation data recording unit for detecting and recording operation data of the vehicle;
   a position detector for detecting and recording a vehicle position;
   an imaging unit for imaging surroundings of the vehicle as a moving picture;
   a risk response detection unit for detecting the physical response of the driver as a risk response based on periodical observations of the response data and the operation data, wherein the physical response is determined as the risk response when the operation data indicates an abnormal condition in response to variation of the response data that exceeds a predetermined value;
   an analysis unit for analyzing the moving picture taken at and around a time of the risk response, wherein the analysis of the moving picture determines and categorizes at least one of a moving object and a fixed object existing around the vehicle; and
   a storage unit for detecting a speed and a moving direction of at least one of the moving object and the fixed object relative to the vehicle based on the analysis by the analysis unit and for storing the speed and the moving direction of at least one of the moving object and the fixed object in association with the vehicle position detected by the position detector.

2. The physical response record system as in claim 1, wherein
   the risk response detection unit classifies the risk response into plural categories based on a type of the operation data that indicates the abnormal condition.

3. The physical response record system as in claim 1, wherein
   map data is provided from a map database, and
   the map data of a map area that includes the vehicle position at a time of the risk response is retrieved from the map database by the storage unit.

4. The physical response record system as in claim 1 further comprising:
   a surrounding condition data acquisition unit for acquiring condition data of a surrounding condition of the vehicle; and
   a condition determination unit for determining the surrounding condition of the vehicle based on the condition data acquired by the surrounding condition data acquisition unit, wherein
   the storage unit stores the surrounding condition determined by the condition determination unit.

5. The physical response record system as in claim 1 further comprising:
   a communication unit for providing communication with an external control station; and
   a control unit for periodically sending information stored in the storage unit to the external control station by using the communication unit.

6. A driver support system having the physical response record system as in claim 1, wherein
   the risk response detection unit provides a warning for the driver when the variation of the response data exceeds the predetermined value and when the operation data indicates the abnormal condition.

7. A physical response record system comprising:
   a physical response recording unit for detecting and recording physical response of a driver of a vehicle as response data that reflects a mental condition of the driver;
   an operation data recording unit for detecting and recording operation data of the vehicle;
   a position detector for detecting and recording a vehicle position;
   an imaging unit for imaging surroundings of the vehicle as a moving picture;
   a risk response detection unit for detecting the physical response of the driver as a risk response based on periodical observations of the response data and the operation data, wherein the physical response is determined as the risk response when the operation data indicates an abnormal condition in response to variation of the response data that exceeds a predetermined value;
   an analysis unit for analyzing the moving picture taken at and around a time of the risk response, wherein the analysis of the moving picture determines a cause of the risk response; and
   a storage unit for storing the cause of the risk response in association with the vehicle position.

8. A physical response recording system comprising
a physical response recording unit for detecting and recording physical response of a driver of a vehicle as response data that reflects a mental condition of the driver;
an operation data recording unit for detecting and recording operation data of the vehicle;
a position detector for detecting and recording a vehicle position;
a risk response detection unit for detecting the physical response of the driver as a risk response based on periodical observations of the response data and the operation data, wherein the physical response is determined as the risk response when the operation data indicates an abnormal condition in response to variation of the response data that exceeds a predetermined value;
an analysis unit for analyzing the risk response based on the response data and the operation data; and
a storage unit for storing the cause of the risk response in association with the vehicle position, wherein
the risk response detection unit classifies the risk response into plural categories based on a type of the operation data that indicates the abnormal condition.

9. A physical response record system comprising:
a physical response recording unit for detecting and recording physical response of a driver of a vehicle as response data that reflects a mental condition of the driver;
an operation data recording unit for detecting and recording operation data of the vehicle;
a position detector for detecting and recording a vehicle position;
an evaluation unit for evaluating driver's skill of driving;
a risk response detection unit for detecting the physical response of the driver as a risk response based on periodical observations of the response data and the operation data, wherein the physical response is determined as the risk response when the operation data indicates an abnormal condition in response to variation of the response data that exceeds a predetermined value;
an analysis unit for analyzing the risk response based on the driver's skill, and one of the response data and the operation data; and
a storage unit for storing the cause of the risk response in association with the vehicle position.

10. The physical response record system as in claim 9, wherein
the evaluation of the driver's skill is correlated with at least one of the response data and the operation data.

11. A method for recording driver's response comprising:
detecting and recording physical response of a driver of a vehicle as response data that reflects a mental condition of the driver;
detecting and recording operation data of the vehicle;
detecting and recording a vehicle position;
imaging surroundings of the vehicle as a moving picture;
detecting the physical response of the driver as a risk response based on periodical observations of the response data and the operation data, wherein the physical response is determined as the risk response when the operation data indicates an abnormal condition in response to variation of the response data that exceeds a predetermined value;
analyzing the moving picture taken at and around a time of the risk response, wherein the analysis of the moving picture determines and categorizes at least one of a moving object and a fixed object existing around the vehicle;
detecting a speed and a moving direction of at least one of the moving object and the fixed object relative to the vehicle based on the analysis of the moving picture; and
storing the speed and the moving direction of at least one of the moving object and the fixed object in association with detection of the vehicle position in a storage.

12. The method for recording driver's response as in claim 11, wherein
the risk response is classified into plural categories based on a type of the operation data that indicates the abnormal condition in a course of detection.

13. The method for recording driver's response as in claim 11, wherein
map data is provided from a map database, and
the map data of a map area that includes the vehicle position at a time of the risk response is retrieved from the map database.

14. The method for recording driver's response as in claim 13, wherein
a driver's skill is evaluated based on the response data and a predetermined criterion determined by the driver, and
the evaluation of the driver's skill is associated to the map data.

15. The method for recording driver's response as in claim 14, wherein
the driver's skill is evaluated based on the analysis of the response data in combination with the operation data.

16. The method for recording driver's response as in claim 13, wherein
a driver's skill is evaluated based on the analysis of the response data, and
the evaluation of the driver's skill is associated to the map data.

17. The method for recording driver's response as in claim 11 further comprising:
acquiring condition data of a surrounding condition of the vehicle; and
determining the surrounding condition of the vehicle based on the condition data of the surrounding condition, wherein the surrounding condition is stored for later provision for the driver.

18. The method for recording driver's response as in claim 11 further comprising:
providing communication with an external control station; and
periodically sending information stored in the storage to the external control station by the communication with the external control station.

* * * * *